No. 736,400. Patented August 18, 1903.

UNITED STATES PATENT OFFICE.

NOAK V. HYBINETTE, OF BAYONNE, NEW JERSEY, ASSIGNOR TO INTERNATIONAL NICKEL COMPANY, A CORPORATION OF NEW JERSEY.

PROCESS OF MAKING NICKEL-IRON ALLOYS DIRECTLY FROM ORES.

SPECIFICATION forming part of Letters Patent No. 736,400, dated August 18, 1903.

Application filed April 30, 1902. Renewed December 27, 1902. Serial No. 136,805. (No specimens.)

*To all whom it may concern:*

Be it known that I, NOAK V. HYBINETTE, a citizen of the United States of America, and a resident of Bayonne, county of Hudson, and State of New Jersey, have invented certain new and useful Improvements in Processes of Manufacturing Nickel-Iron Alloy Directly from Complex Ores, of which the following is a specification.

The only way in which nickel-steel is made to-day is to smelt iron of a suitable quality and to the molten iron add pure nickel as metal or oxid.

It is a well-known fact that the sulfid ores from which nickel is made contain large quantities of iron, and this iron has all to be slagged off at a great expense and is thrown away before the refined nickel can be produced. I have now found a way to treat these ores so as to remove all other metals and impurities which are detrimental to the quality of nickel-steel and still leave the iron with the nickel, so that when the final reduction takes place the result will be an alloy of nickel and iron.

The sulfid ores to which I have referred are generally composed of about five per cent. sulfid of nickel, five per cent. sulfid of copper, and eighty-five per cent. sulfid of iron. They may also contain small percentages of other metals as sulfids or otherwise; but as these metals are of no importance in the process I do not mention them. The one essential metal which I have to remove from the iron and nickel is copper, and the way I do it is by utilizing a somewhat-modified Henderson chloridizing roasting. The ore is ground fine and mixed with some salt (NaCl) and roasted so as to produce chlorid of copper, chlorid of nickel, and chlorid of iron in small quantities and the remainder of the metals as oxids. This mixture of chlorids and oxids is then kept at a low red heat until the chlorid of iron and the chlorid of nickel are decomposed and the thereby-released chlorin has attached the copper which did not already exist as a chlorid and all the copper is chloridized. After having been cooled, the material is leached in the ordinary way with water and weak acid, extracting the copper and leaving the nickel and iron as oxids. Small quantities of copper and sulfur are still present in the residue from the leaching; but for ordinary purposes a good enough nickel-steel can be produced from this product. If, however, greater purity is required, it can be obtained by mixing the material with hydrochloric acid or its chemical equivalent and heating the material once more to a low red heat, thereby chloridizing the last traces of copper, which may be leached out with water and acid. If a material very low in sulfur is required, it can be obtained either by treating the residue with a strongly-oxidizing solution, such as nitric acid, in which way a trace of copper is removed at the same time, or the residue may be roasted at a high heat. The resulting oxids of iron and nickel are reduced in the same way as ordinary iron ores and nickel-steel thereby produced.

What I claim as my invention is—

The hereinbefore-described process of producing nickel-steel from ores composed mainly of sulfids of iron, nickel and copper, consisting in roasting the ore with salt, heating the material so as to decompose the chlorids of iron and nickel, leaching out the chlorid of copper and then reducing the residue directly into nickel-steel substantially as described.

Signed at New York this 29th day of April, 1902.

NOAK V. HYBINETTE.

Witnesses:
J. M. HOWARD,
C. SEDGWICK.